United States Patent
Oba et al.

Patent Number: 5,414,566
Date of Patent: May 9, 1995

[54] APPARATUS AND METHOD FOR GENERATING HIGH SPEED DUBBING SIGNAL

[75] Inventors: Yoshinobu Oba; Hideo Oshima; Toshihiro Uehara, all of Tokyo, Japan

[73] Assignee: Nippon Hoso Kyokai, Tokyo, Japan

[21] Appl. No.: 186,888

[22] Filed: Jan. 26, 1994

Related U.S. Application Data

[63] Continuation of Ser. No. 936,264, Aug. 27, 1992, abandoned.

[30] Foreign Application Priority Data

Aug. 28, 1991 [JP] Japan .................. 3-217238

[51] Int. Cl.$^6$ .................. G11B 27/02; G11B 5/00; G11B 5/09; H04N 5/86
[52] U.S. Cl. .................. 360/13; 360/32; 360/10.1; 360/15
[58] Field of Search .................. 360/13, 48, 62, 32, 360/10.1, 9.1, 15

[56] References Cited

U.S. PATENT DOCUMENTS

| | | | |
|---|---|---|---|
| 4,389,681 | 6/1983 | Tanaka et al. | 360/48 X |
| 4,544,958 | 10/1985 | Odaka | 360/32 X |
| 4,870,509 | 9/1989 | Nagasawa et al. | 360/10.1 X |
| 4,888,653 | 12/1989 | Cullum | 360/15 |
| 4,899,230 | 2/1990 | Sherritt | 360/15 |
| 5,198,940 | 3/1993 | Nagasawa et al. | 360/9.1 |

FOREIGN PATENT DOCUMENTS 0421417 4/1991 European Pat. Off. .
60-1628 1/1985 Japan .
62-185248 2/1988 Japan .

*Primary Examiner*—Aristotelis Psitos
*Assistant Examiner*—Jennifer Pearson Wright
*Attorney, Agent, or Firm*—Spencer, Frank & Schneider

[57] ABSTRACT

An apparatus for generating a high speed dubbing signal to be recorded by an external recording apparatus. The high speed dubbing signal, whose pitch is N times that of a digital input signal, is generated as follows. An encoding circuit subsamples the digital input signal consisting of frame signals each of which consists of N field signals, so that each frame signal is compressed by a factor of N to be contained in one field interval. A digital signal recording and reproducing circuit including a recording and reproduction system, records on a tape, at a normal tape speed and at a normal head drum rotational frequency, the compressed signal in such a manner that each field including the compressed signal appears once per frame interval, and then selectively reproduces from the tape the field including the compressed signal at a tape speed N times the normal speed and at the normal drum speed. A decoding circuit interpolates the output signal of the recording and reproducing portion to recover the lost information by the subsampling. An output portion produces the high speed dubbing signal based on the output of the decoding circuit. Since the drum rotational frequency is maintained at the normal value throughout the recording and reproduction procedure by the recording and reproduction system, the contact between the tape and head of the system is stabilized, thereby enabling reliable high speed dubbing.

18 Claims, 11 Drawing Sheets

APPARATUS AND METHOD FOR GENERATING HIGH SPEED DUBBING SIGNAL

This application is a continuation of application Ser. No. 07/936,264, filed Aug. 27, 1992, now abandoned.

BACKGROUND OF THE INVENTION

1. Field of the Invention

The present invention relates to an apparatus and method for generating a high speed dubbing signal to be recorded by an external recording system.

2. Description of the Prior Art

High speed analog dubbing of video and audio signals can be achieved, for example, by reproducing video and audio signals recorded on a tape at a speed N times the normal reproduction speed so that the pitch (or frequency) of the signals become N times that of the original signals, and by recording the reproduced signals on another tape at N times the normal speed, thereby reducing the dubbing time to 1/N times the actual time of the video and audio signals. Here, N times the normal speed means that both the tape and head drum move N times their normal speeds, respectively. This dubbing method can form the same magnetization patterns on a copy tape as those formed by real time, normal speed dubbing because the video and audio signals are reproduced from the original tape at the speed N times the normal speed, and are recorded on another tape at the same speed.

To perform such high speed dubbing, a one-inch helical analog VTR for broadcast use is commonly employed, for example. The apparatus reproduces double pitched video and audio signals by doubling both the normal head drum speed and tape traveling speed.

Thus, when a conventional one-inch helical analog VTR for broadcast use is employed in high speed dubbing, the head drum speed must be increased to 7200 r.p.m., that is, a speed twice the normal reproduction speed. However, this presents a problem in that the contact between a tape and the heads in the rotating head drum becomes unstable. Generally speaking, the floating height d of a tape over a head drum is expressed by the following equation:

$$d \propto T^{-1} \times K^{\frac{2}{3}} \quad (1)$$

where K is the number of rotations of the head drum, and T is the tension of the tape. Equation (1) shows that the floating height d of the tape over the head drum increases with the head drum rotational frequency K. Accordingly, the tape travel on the head drum becomes more unstable as the number of rotations of the head drum increases, thereby causing greater fluctuations of the head output. To solve this problem, an increase in the tape tension T may be thought to be effective. This, however, cannot be an effective means because it increases tape damage.

On the other hand, the head output loss L due to the separation S between the head and the tape during reproduction can be expressed by the following Equation (2):

$$L = 54.6 \times (S/\lambda) db \quad (2)$$

where $\lambda$ is a recording wavelength.

Generally, the floating height d of the tape over the head drum, and hence, the separation S between the tape and the head, increases consistently with the drum rotational frequency K. Thus, as shown in Equation (2), the output loss L of the head increases in a region where the recording wavelengths $\lambda$ are short so that the balance is disturbed between the upper sideband and the lower sideband of an FM modulated signal of a tape reproduction signal. This presents a problem in that the video signal is distorted during the demodulation of the FM modulated signal.

In addition, since the conventional method employs an analog VTR, the S/N ratios and the distortion characteristics of reproduced video and audio signals in the dubbing process greatly depend on the characteristics of the tape and heads, and cannot meet the specifications required.

SUMMARY OF THE INVENTION

Accordingly, it is an object of the present invention to provide an apparatus and method for generating a high speed dubbing signal, which can provide greatly improved signals in S/N and distortion ratios in the dubbing process by eliminating the above-described disadvantages associated with the conventional techniques.

In a first aspect of the present invention, there is provided an apparatus for generating a high speed dubbing signal from a first digital signal consisting of frame signal, each of the frame signal consisting of N (N is an integer greater than one) field signals, the apparatus comprising:

data compressing means for compressing the first digital signal by a factor of N by alternately compressing the N field signals in one frame interval so that one frame signal is compressed to one field interval, and by arranging the compressed data sequentially into one field to form a second digital signal;

recording means including a head drum that rotates heads for performing helical recording of the second digital signal on a tape at a normal tape speed and at a normal drum rotational frequency in such a manner that each field of the second digital signal is recorded at one frame interval;

reproduction means including a head drum that rotates heads for reproducing only the second digital signal from the tape at a tape speed N times the normal tape speed and at the normal drum rotational frequency;

means for rearranging the reproduced second digital signal in such a manner that data of each field of the second digital signal are reassigned to N fields during one field interval to form a third digital signal;

means for expanding the third digital signal so that data which have been compressed are recovered to generate a fourth digital signal having a pitch N times that of the first digital signal; and means for outputting the fourth digital signal as the high speed dubbing signal having the pitch N times that of the first digital signal.

Here, the integer N may be two, three or four.

The recording means and reproduction means may use the head drum and the heads in common, the heads being vertically swung so that one of every N field signals on the tape are selectively reproduced.

The first digital signal may be a digital video signal and a digital audio signal.

In a second aspect of the present invention, there is provided an apparatus for generating a high speed dubbing signal from a first digital signal consisting of frame signals, each of the frame signals consisting of N (N is an integer greater than one) field signals, the apparatus comprising:

recording means, including N head drums each of which rotates heads, for performing helical recording of the first digital signal on N tapes at a normal tape speed and at a normal drum rotational frequency;

reproduction means, including N head drums each of which rotates heads, for reproducing during one frame interval only one field signal of the first digital signal from each one of the tape at a tape speed N times the normal tape speed and at a normal drum rotational frequency, thereby reproducing N field signals belonging to different fields during one frame interval;

means for rearranging the reproduced N field signals by sequentially assigning each one of the N field signals to one field interval to form a second digital signal having a pitch N times that of the first digital signal; and means for outputting the second digital signal as the high speed dubbing signal having the pitch N times that of the first digital signal.

In a third aspect of the present invention, there is provided a method for generating a high speed dubbing signal from a first digital signal consisting of frame signals, each of the frame signals consisting of N (N is an integer greater than one) field signals, the method comprising the steps of:

compressing the first digital signal by a factor of N by alternately compressing the N field signals in one frame interval so that one frame signal is compressed to one field interval, and by arranging the compressed data sequentially into one field to form a second digital signal;

performing helical recording of the second digital signal on a tape at a normal tape speed and at a normal drum rotational frequency in such a manner that each field of the second digital signal is recorded at one frame interval;

reproducing only the second digital signal from the tape at a tape speed N times the normal tape speed and at the normal drum rotational frequency;

rearranging the reproduced second digital signal in such a manner that data of each field of the second digital signal are reassigned to N fields during one field interval to form a third digital signal;

expanding the third digital signal so that data which have been compressed are recovered to generate a fourth digital signal having a pitch N times that of the first digital signal; and outputting the fourth digital signal as the high speed dubbing signal having the pitch N times that of the first digital signal.

In a fourth aspect of the present invention, there is provided a method for generating a high speed dubbing signal from a first digital signal consisting of frame signals, each of the frame signals consisting of N (N is an integer greater than one) field signals, the method comprising the steps of:

performing helical recording of the first digital signal on N tapes at a normal tape speed and at a normal drum rotational frequency;

reproducing during one frame interval only one field signal of the first digital signal from each one of the tape at a tape speed N times the normal tape speed and at a normal drum rotational frequency, thereby reproducing N field signals belonging to different fields during one frame interval;

rearranging the reproduced N field signals by sequentially assigning each one of the N field signals to one field interval to form a second digital signal having a pitch N times that of the first digital signal; and outputting the second digital signal as the high speed dubbing signal having the pitch N times that of the first digital signal.

According to the above mentioned arrangement, the reproduction of the digital signal with a tape speed of N times the normal speed can be achieved without changing the number of rotations of the head drum. That is, the rotational frequency of the head drum of the reproduction apparatus is kept identical to that of the normal reproduction. This stabilizes the contact between the tape and head, thereby generating a reliable, high speed dubbing signal. In addition, since the present invention employs a digital recording and reproduction system, it can completely eliminate the fluctuation of amplitude and phase due to the contact between the tape and head, and the distortion of video and audio signals of reproduced signals due to FM demodulation distortion. Moreover, since the S/N and distortion ratios of the reproduced, N-times pitch video and audio signals are not affected by the characteristics of the tape and head in the digital recording and reproduction system, the S/N and distortion ratios are greatly reduced in comparison with the conventional high speed dubbing employing an analog recording and reproduction.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

Embodiment 1

Figure 1:
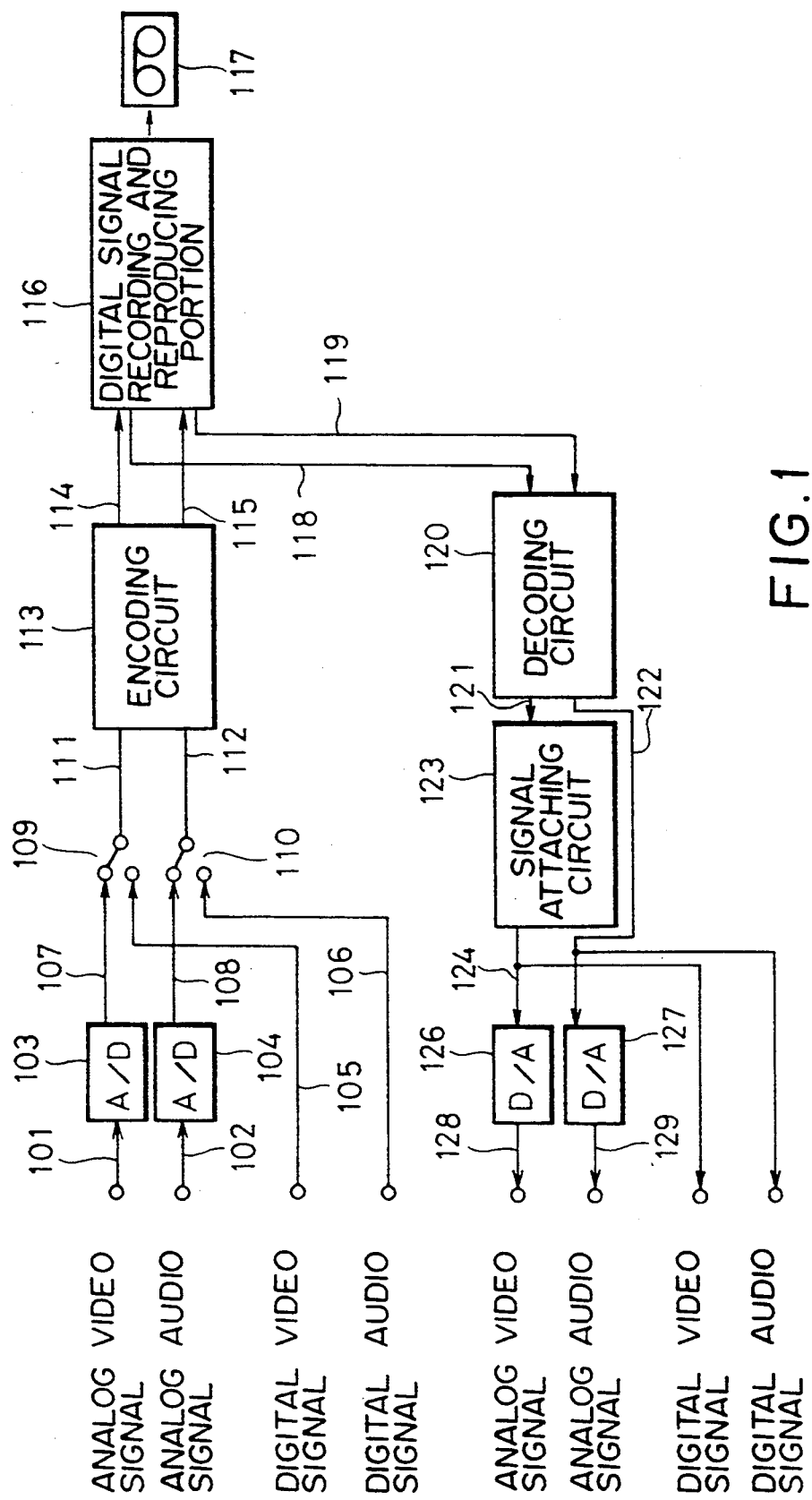
FIG. 1 is a block diagram showing the arrangement of a first embodiment of an apparatus and method for generating a high speed dubbing signal according to the present invention.

FIG. 1 is a block diagram showing the arrangement of a first embodiment of an apparatus and method for generating a high speed dubbing signal in accordance with the present invention. In this figure, an analog video signal 101 and an analog audio signal 102 are inputted to A/D converters 103 and 104, and are converted into a digital video signal 107 and a digital audio signal 108, respectively, when a recording is carried out. The digital signals 107 and 108 are applied to respective first input terminals of switches 109 and 110, and are selectively outputted. On the other hand, a digital video signal 105 and a digital audio signal 106 are applied to respective second input terminals of the switches 109 and 110, and are selectively outputted. Thus, the switches 109 and 110 select one of the two inputs, and output a digital video signal 111 and a digital audio signal 112, respectively, which are subjected to data-compression (subsampling) by an encoding circuit 113. The subsampled digital video and audio signals 114 and 115 are inputted to a digital signal recording and reproducing portion 116, and are recorded on a cassette tape 117 at the normal tape traveling speed and normal drum rotational frequency.

On the other hand, reproduction is carried out as follows: First, the signals recorded on the cassette tape 117 are reproduced by the digital signal recording and reproducing portion 116 at a tape traveling speed of N times the normal speed and the normal drum rotational frequency, and are reproduced as a digital video signal 118 and a digital audio signal 119. The digital signals 118 and 119 are inputted to a decoding circuit 120 for decoding, and are outputted as a digital video signal 121 and a digital audio signal 122. In addition, the digital video signal 121 is inputted to a signal attaching circuit 123 that adds NTSC synchronizing signals and a subcarrier thereto, and outputs it as a digital video signal 124. At the same time, the digital video signal 124 and the digital audio signal 122 are inputted to D/A converters 126 and 127 to be converted into analog signals, and are outputted as an analog video signal 128 and an analog audio signal 129, respectively. The analog output signals 128 and 129 are recorded on a tape by an external analog recording apparatus at a tape speed of N times the normal speed and at a drum rotational speed of N times the normal drum rotational frequency.

The operation of the first embodiment in accordance with the present invention will be described assuming that the input video signal is an NTSC signal and the audio signal is a two-channel signal. When the input video signal is the analog signal 101, it is quantized by the A/D converter 103 into an 8-bit digital signal at a sampling frequency of 4 fsc, where fsc is a subcarrier frequency, and is applied to the switch 109 as the digital video signal 107. When the input signal is the two-channel (A1 and A2) analog audio signal 102, it is quantized by the A/D converter 104 into a 16-bit signal at an sampling frequency of 48 kHz, and is applied to the switch 110 as the digital audio signal 108. The switches 109 and 110 select the digital video signal 107 and the digital audio signal 108 when the input signals are analog, and select the digital video signal 105 and the digital audio signal 106 when the input signals are digital. The selected digital signals are inputted to the encoding circuit 113 as the digital video signal 111 and the digital audio signal 112.

Figures 2A, 2B:
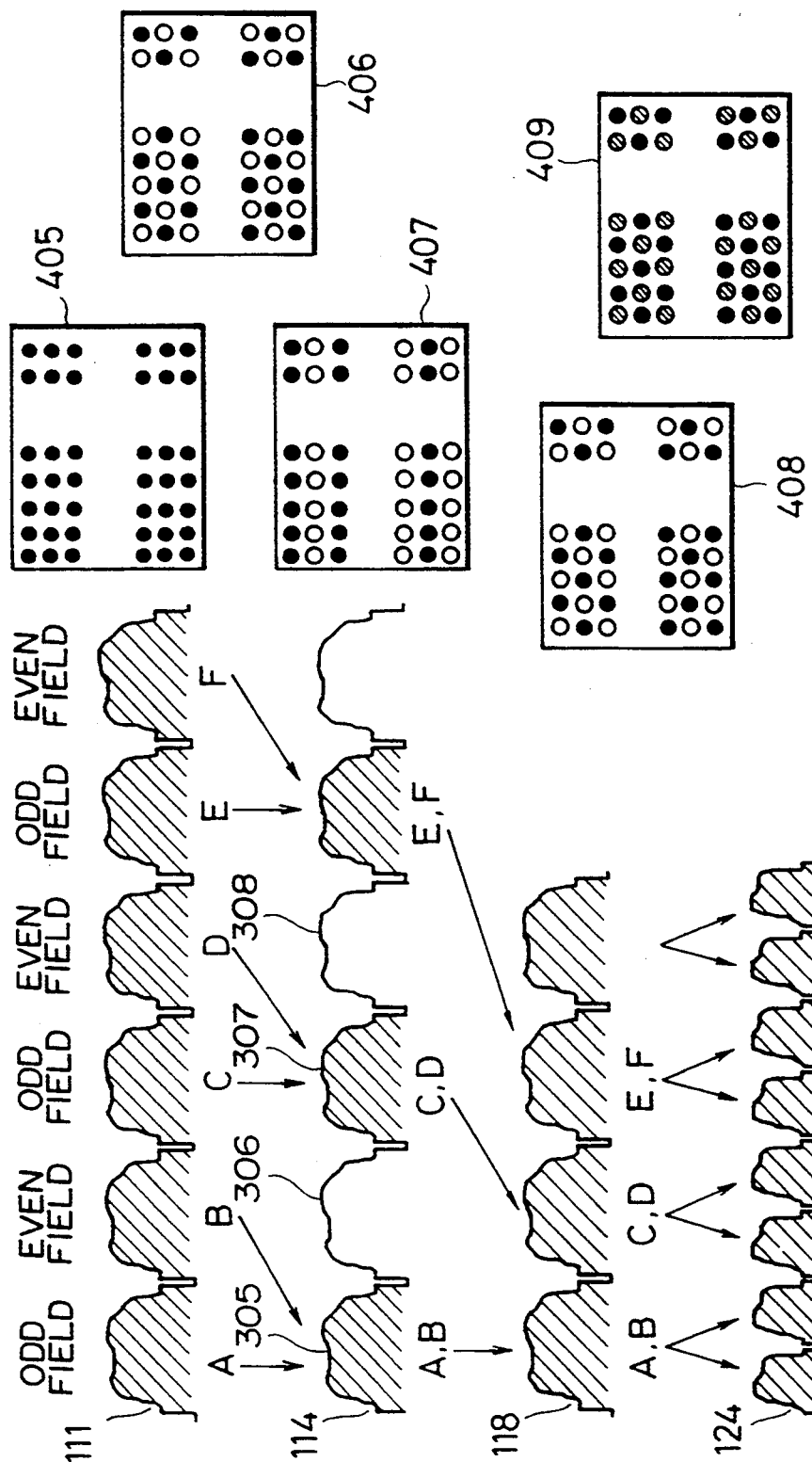
FIGS. 2A and 2B are schematic diagrams illustrating the state of processing of digital video signals in the first embodiment.
Figure 3:
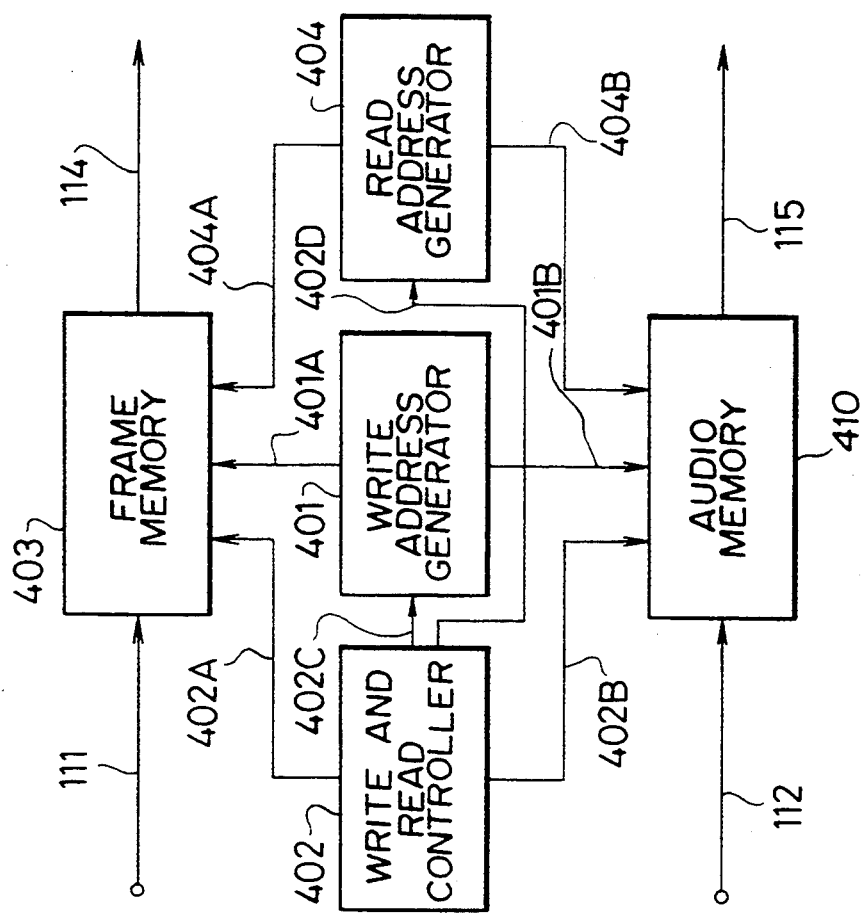
FIG. 3 is a block diagram showing an arrangement of an encoding circuit of the first embodiment.

The operation of the encoding circuit 113 will now be explained referring to FIGS. 2A, 2B and 3. FIG. 2A illustrates waveforms of video signals, and FIG. 2B illustrates frame images. In FIG. 2A, A–F indicate image data included in the digital video signal 111, and in FIG. 2B, closed or blackened circles represent effective pixels, open circles represent sites of pixels to be omitted or omitted pixels by subsampling, that is, ineffective pixels, and shaded circles denote interpolated pixels. FIG. 3 is a block diagram of the encoding circuit 113.

First, the digital video signal (NTSC signal) 111 is written into a frame memory 403 in such a manner that it composes a frame image 405. This is performed as follows: first, a write and read controller 402 produces a control signal 402A for switching the operation mode of the frame memory 403 into a write mode, and a start signal 402C for activating a write address generator 401; and second, the digital video signal 111 is written into the frame memory 403 in accordance with a write address 401A generated by the write address generator 401. Since the digital video signal 111 is formed by interlace scanning, odd horizontal lines are associated with an odd field, and even horizontal lines, with an even field.

Subsequently, half the entire pixels constituting the frame image 405 are subsampled in a line-quincunx pattern. A frame image 406 represents the sites of omitted pixels and effective pixels. The effective pixels of each even horizontal line associated with an even field substitute for vacant (ineffective) pixels immediately above the effective pixels, thereby generating a frame image 407 which includes effective pixels only in odd fields, and hence, is compressed to half the data amount. A digital video signal 114 corresponding to the frame image 407 which is compressed to half the data amount is outputted from the encoding circuit 113. More specifically, the write and read controller 402 provides the frame memory 403 with the control signal 402A to enter into a read mode, and provides a read address generator 404 with a start signal 402D to initiate the read operation. The read address generator 404 produces a read address 404A in such a manner that the effective pixels as shown in the frame image 406 are alternately read from the two adjacent horizontal lines (a pair of horizontal lines from the odd field and the even field) in the frame image 405 stored in the frame memory 403. Thus, pixels from the odd and even fields are subsampled and alternately arranged in the odd field horizontal lines as shown in the frame image 407, and the digital video signal 114 which is compressed to half the data amount per frame is outputted from the frame memory 403.

Figure 4:
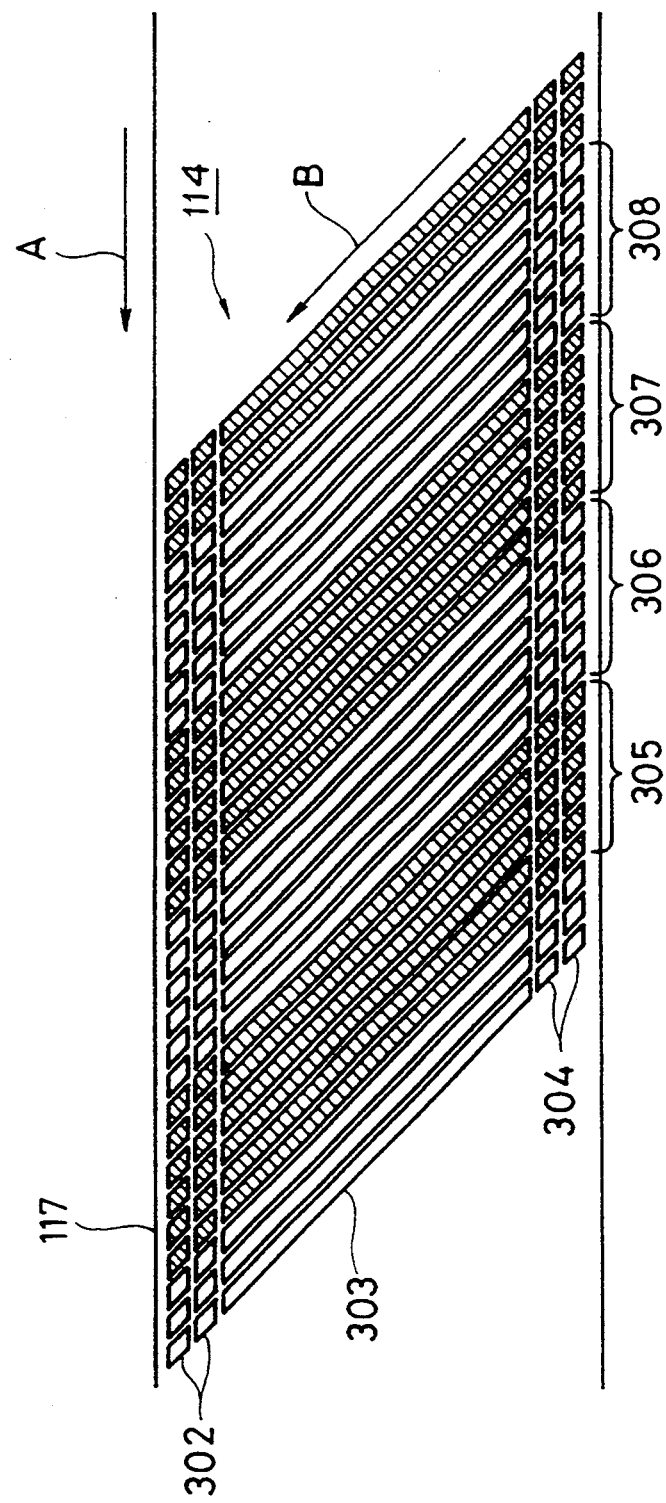
FIG. 4 is a schematic diagram illustrating the recorded state of digital video and audio signals on a tape.
Figure 5A:
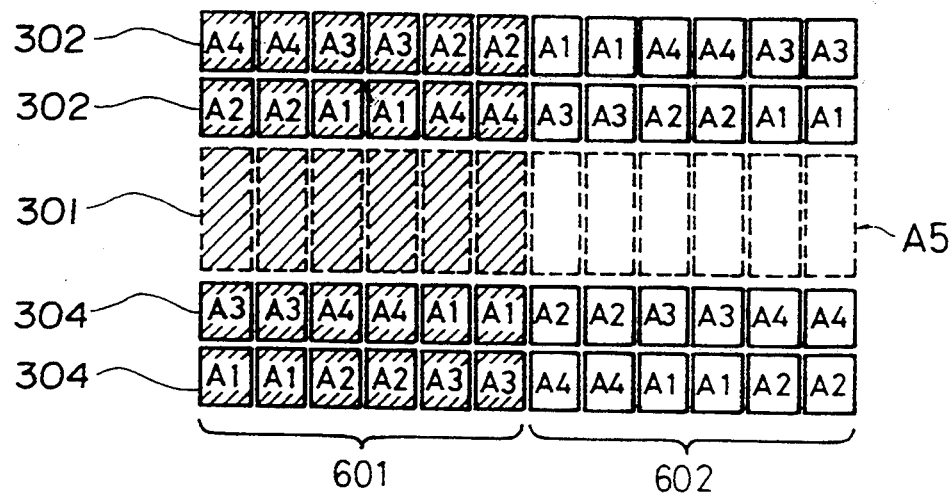
FIGS. 5A and 5B are schematic diagrams illustrating the recorded state of the digital audio signal on the tape.
Figure 5B:
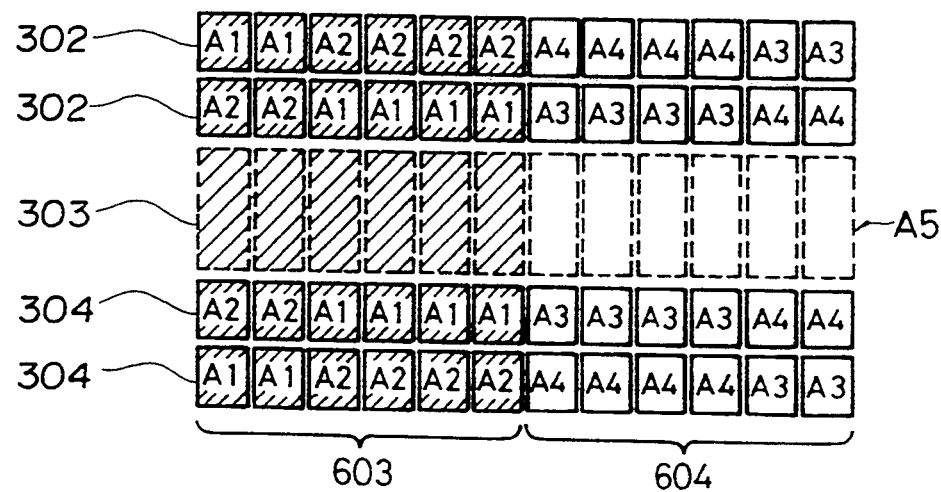

With regard to the recording of the digital audio signal, a common digital VTR includes audio recording sectors associated with four channels A1–A4 as shown in FIG. 5A (see FIG. 4 also). The audio recording sectors associated with channels A1–A4 are equally distributed to odd field recording tracks 601 and even field recording tracks 602. The recording tracks 601 and 602 comprises six tracks each, and the digital video signal is recorded on the sectors A5 which also includes six tracks for each field. The audio recording sectors distributed as shown in FIG. 5A are rearranged as shown in FIG. 5B by the encoding circuit 113. More specifically, the audio sectors of the channels A3 and A4 in the odd field recording tracks 601 are exchanged with the audio sectors of the channels A1 and A2 in the even field recording tracks 602. Thus, odd field recording tracks 603 including only the audio sectors of the channels A1 and A2, and even field recording tracks 604 including only the audio sectors of the channels A3 and A4 are formed as shown in FIG. 5B. This process is achieved as follows: First, the write and read controller 402 provides an audio memory 410 with a control signal 402B to enter into a write mode, and provides the write address generator 401 with the start signal 402C to initiate the write operation. The write address generator 401 produces a write address 401B, and the digital audio signal 112 is written into the audio memory 410 in accordance with the write address 401B. Second, the write and read controller 402 provides the audio memory 410 with the control signal 402B to enter into a read mode, and the read address generator 404 with the start signal 402D to initiate the read operation. The read address generator 404 produces a read address 404B, and the digital audio signal 112 is read from the audio memory 410 in accordance with the read address 404B, and is outputted as the digital audio data 115.

A digital signal recording and reproducing portion 116 operates at the normal tape speed and the normal drum rotational frequency so that it records six tracks per field as shown in FIG. 4. Thus, the digital signal recording and reproducing portion 116 records on the cassette tape 117 an odd field 305, an even field 306, an odd field 307, an even field 308 and so forth, which constitute the digital video signal 114 and the digital audio signal 115 produced from the encoding circuit 113. Here, the video sectors are denoted by reference number 303 and the audio sectors by 302 and 304. As a result, the cassette tape 117 can be obtained on which the effective pixel data of the digital video signal 114 and the audio data of the digital audio signal 115 are recorded only on the odd field recording tracks.

Figure 6:
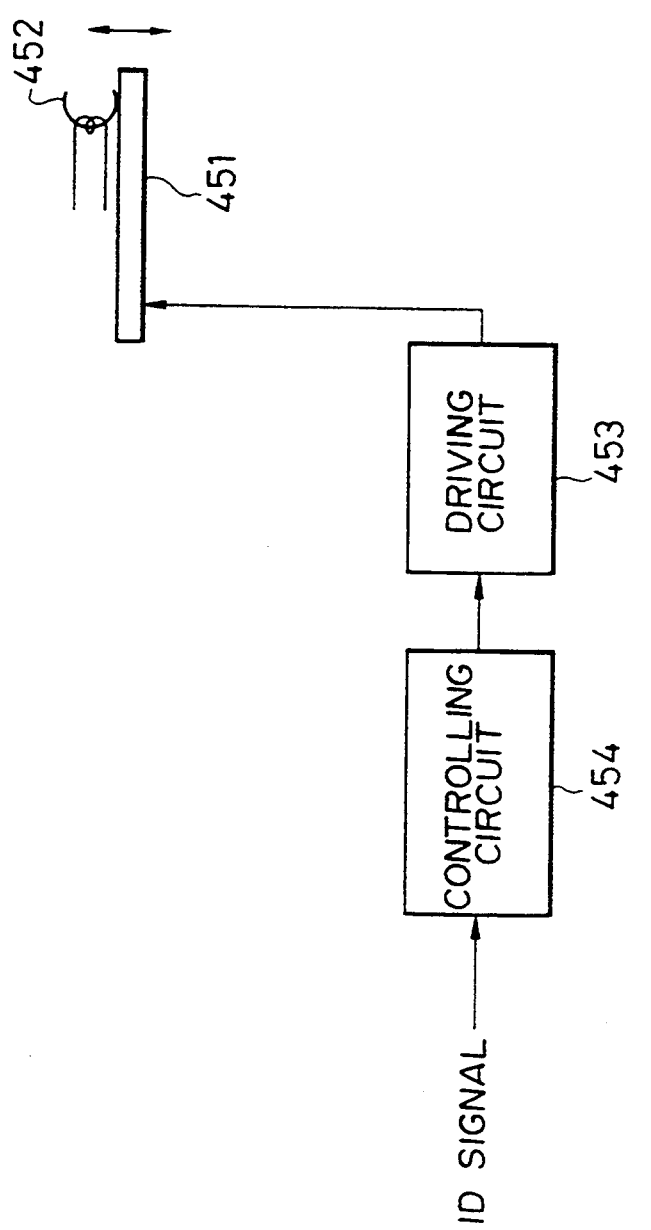
FIG. 6 is a schematic block diagram showing a track selection controlling means in the first embodiment.

The digital signal recording and reproducing portion 116 reproduces the recorded signals on the cassette tape 117 by using a selection and control means as shown in FIG. 6. In this case, the tape traveling speed is set at twice the normal speed and the drum rotational frequency is set at the normal value. The digital video signal 114, which has been subjected to the data compression as shown in FIGS. 2A and 2B, is being selectively reproduced so that continuous field intervals along the real time axis are occupied only by odd field components of the digital video signal 114 as shown in FIG. 2A. Thus, the digital video signal 118 is generated, and is inputted to the decoding circuit 120. Similarly, the digital signal recording and reproducing portion 116 selectively reproduces only the odd field components of the digital audio signal so that they occupy continuous field intervals, thereby generating the digital audio signal 119 inputted to the decoding circuit 120.

In FIG. 6, reference numeral 451 designates a movable element, such as a bimorph cell, whose displacement can be electrically controlled. The movable element 451 is disposed in the head drum so as to rotate in conjunction with the drum. A reproduction head 452 is attached on top of the movable element 451 so that the head 452 shifts in the direction of the axis of the drum in accordance with the displacement of the movable element 451. The movable element 451 is electrically driven by a driving circuit 453 which in turn is controlled by a controlling circuit 454.

During the reproduction from the cassette tape 117, the ID (identification) signal reproduced from the tape is inputted to the controlling circuit 454. The controlling circuit 454 provides the driving circuit 453 with displacement information that indicates the scanning position of the reproduction head 452 on the tape so that the head 452 reads only the odd field tracks on the cassette tape 117. The driving circuit 453 drives the movable element 451 in accordance with the displacement information.

During the reproduction, the tape speed is set at twice the normal speed, whereas the drum rotational frequency is set at the normal speed. Consequently, the time period required for the cassette tape 117 to travel by an amount corresponding the one-frame tracks is equal to the time period required for the reproduction head 452 to scan on the odd field tracks. Thus, only odd field components of the video signal 114 are reproduced from the cassette tape 117 at the tape speed twice the normal speed, and at the normal drum rotational frequency, so that the odd field components occupy continuous field intervals along the real time axis as in the digital video signal 118.

The decode circuit 120 performs the reverse operation as that of the encoding circuit 113. Here, the digital video signal 118 inputted to the decoding circuit 120 are composed of only odd field signals in the frame image 407 which actually includes alternate odd and even field pixels in each line. The decode circuit 120 operates as follows. First, the odd number pixels of each odd horizontal line associated with an odd field in the frame image 407 substitute for the vacant pixels which are located immediately below the odd number pixels, and belong to the even horizontal line immediately under the odd horizontal line, thus forming a frame image 408 corresponding to the frame image 406 formed before recording. In the frame image 408, the ineffective pixels represented by the open circles are interpolated by using the surrounding effective pixels denoted by the closed circles, thereby generating an interpolated frame image 409.

Figure 7A:
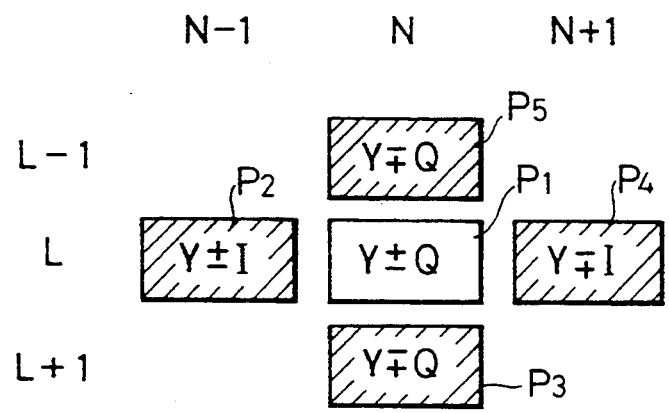
FIGS. 7A and 7B are schematic diagrams illustrating an interpolation processing in the first embodiment.
Figure 7B:
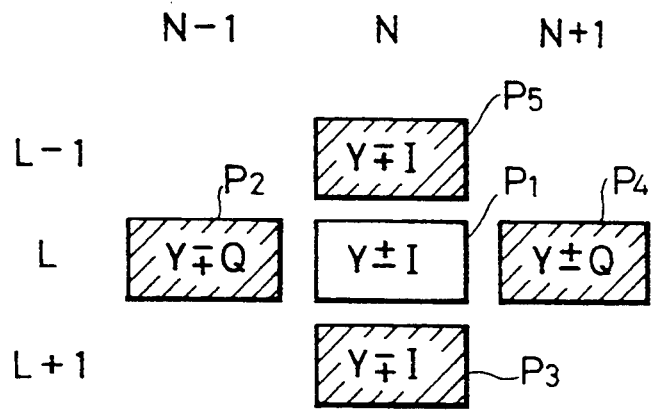

Next, a method for interpolation will be described with reference to FIGS. 7A and 7B. The sampled NTSC signal at the sampling frequency 4 fsc is schematically illustrated in FIGS. 7A and 7B, and a center pixel is calculated by using the following equation (3).

$$P1 = (P2 + P4) - (P3 + P5)/2 \qquad (3)$$

where P2–P5 are data values of pixels surrounding the central pixel whose data value is P1 as shown in FIGS. 7A and 7B. In these figures, Y represents the luminance signal; I and Q represent the chrominance signals; L represent the line number in the frame images 408 and 409; and N represent the sample number in a line. Further, P1 corresponds to an ineffective pixel represented by an open circle in the frame image 408, and P2–P5 correspond to effective pixels surrounding that ineffective pixel associated with P1. The digital video signal 121 associated with the interpolated frame image 409 is inputted to the signal attaching circuit 123. With regard to the audio signal, on the other hand, the decoding circuit 120 converts the reproduced digital signals the A1 and A2 channels to the double pitched, two-channel digital audio signal 122, which is a temporary continuous serial signal.

The signal attaching circuit 123 generates the double pitched digital video signal 124 as shown at the bottom of FIG. 2A from the inputted digital video signal 121 associated with the interpolated frame image 409. This is performed by adding a synchronizing signal whose pitch is twice that of the NTSC synchronizing signal, and by adding a subcarrier (2 fsc) whose pitch is twice the subcarrier (fsc). The digital video signal 124 is further converted into the analog video signal 128 with the D/A converter 126. The two-channel digital audio signal 122, on the other hand, is converted into the analog audio signal 129 by the D/A converter 127.

Figure 8:
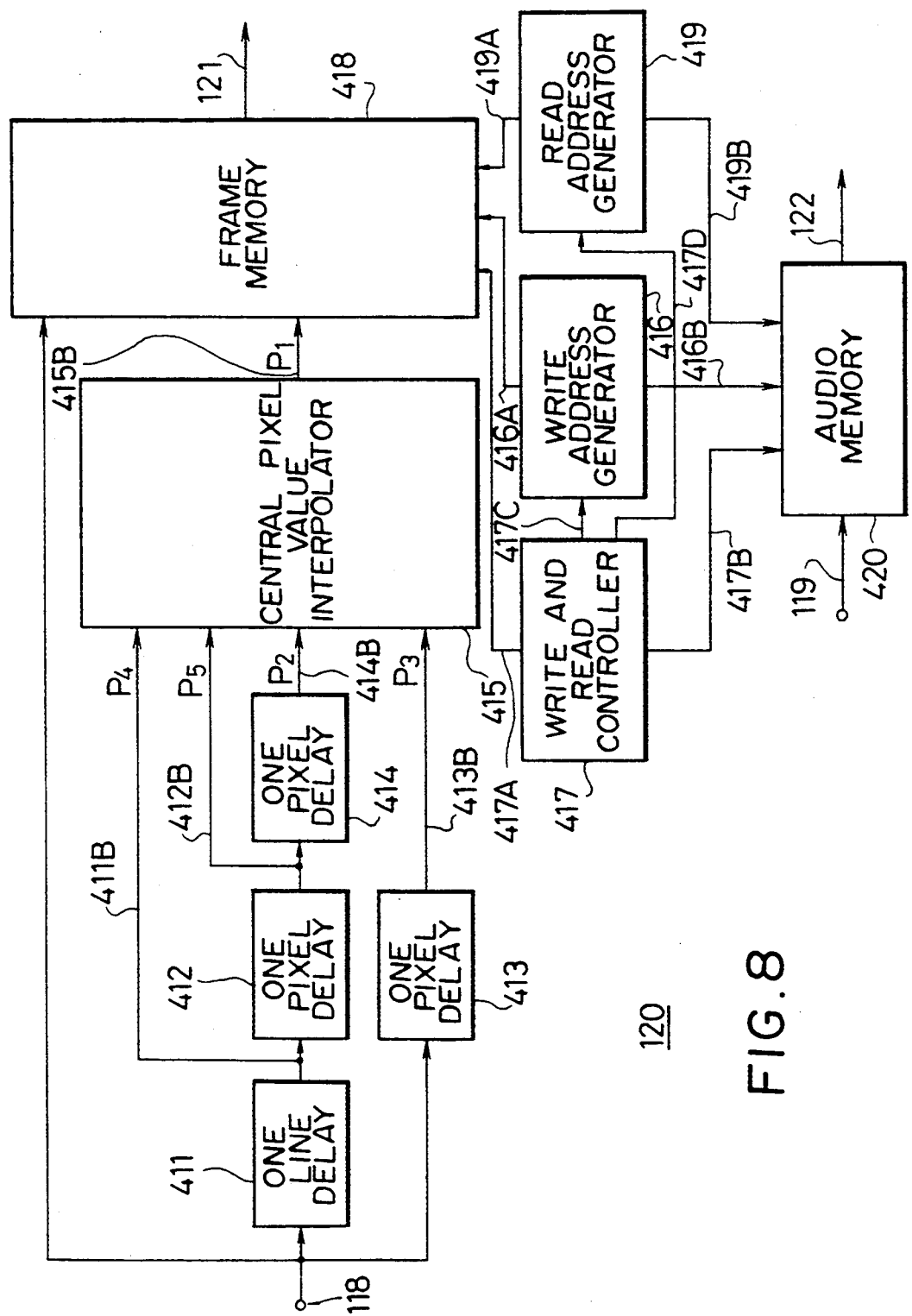
FIG. 8 is a block diagram showing the arrangement of a decoding circuit of the first embodiment.

Next, the video and audio signal processing in the decoding circuit 120 will be described in more detail with reference to FIG. 8. Here, the digital video signal 118 inputted to the decoding circuit 120 has been formed by interlace scanning, and is composed of only the odd field components in the frame image 407 which includes alternate even and odd field pixels in each line. This digital video signal 118 is processed by the decoding circuit 120 so that the interpolated frame image 409 is generated by providing interpolation for the ineffective pixels indicated by open circles by using the effective pixels surrounding them in the frame image 408. To achieve this, the digital video signal 118 is supplied to a 1-line delay element 411, 1-pixel delay elements 412, 413 and 414 so that data 414B, 413B, 411B and 412B associated with the four pixels P2, P3, P4 and P5 surrounding the central pixel P1 are generated and inputted to a central pixel value interpolator 415. The central pixel value interpolator 415 interpolates the value of the central pixel P1 by applying equation (3), and outputs it as an interpolated signal 415B.

Subsequently, the signals 118 and 415B associated with the effective pixels and interpolated central pixels P1 are written into the frame memory 418 in the pixel arrangement of the interpolated frame image 409 as shown in FIG. 2B. This is performed as follows: first, a write and read controller 417 provides the frame memory 419 with a control signal 417A for switching the operation mode of the frame memory 418 into a write mode, and also provides a write address generator 416 with a start signal 417C for activating it; and second, the digital video signal 118 together with the interpolation signal 415B associated with the central pixels P1 are written into the frame memory 418 in accordance with a write address 416A generated by the write address generator 416. Subsequently, the content of the frame memory 418 corresponding to the frame image 409 is sequentially read from the frame memory 418 by using a clock signal whose frequency is 8 fsc, and the read signal constitutes the digital video signal 121. This is performed as follows: first, the write and read controller 417 provides the frame memory with the control signal 417A to switch the operation mode of the frame memory 418 into a read mode, and also provides a read address generator 419 with a start signal 417D to activate it; and second, the stored data in the frame memory 418 is read out in accordance with a read address 419A generated by the read address generator 419. The read out data, that is, the digital video signal 121, is converted into the double pitched digital video signal 124 by adding the synchronizing signal whose pitch is twice that of the NTSC synchronizing signal, and by further adding the subcarrier (2 fsc) whose pitch is twice the subcarrier (fsc). Next, the processing of the audio signal in the decoding circuit 120 and the signal attaching circuit 123 will be described. The digital audio signal 119 inputted to the decoding circuit 120 is written into an audio memory 420 so that the audio signal of the A1 and A2 channels is decoded. This is performed as follows: first, the write and read controller 417 provides the audio memory 420 with a control signal 417B to switch the operation mode of the audio memory 420 into a write mode, and also provides the write address generator 416 with the start signal 417C to activate the generator; and second, the audio signal 119 is written into the audio memory 420 in accordance with a write address 416B generated by the write address generator 416. Subsequently, the content of the audio memory 420 is sequentially read therefrom: first, the write and read controller 417 provides the audio memory 420 with the control signal 417B to switch the operation mode of the audio memory 420 into a read mode, and also provides the read address generator 419 with the start signal 417D to activate the generator; and second, the stored data in the audio memory 420 is read out in accordance with a read address 419B generated by the read address generator 419 as the double pitched, two-channel digital audio signal 122.

The double pitched digital video signal 124 and digital audio signal 122, or the corresponding analog video signal 128 and analog audio signal 129 obtained by converting the digital signals 124 and 122 through the D/A converters 126 and 127, are subjected to high speed dubbing by an external VTR whose tape speed is twice the normal speed.

The data compression method described above is an example, and other compression methods can be employed. For example, a data compression method such as a DCT (Dicrete Cosine Transform) or a Wavelet or an LOT (Lapped Orthogonal Transform) can be employed. Furthermore, although only the tracks recording the odd fields are reproduced from the tape in the first embodiment, any arrangement of tracks can be employed within one frame interval or within a predetermined unit time period. For example, it is possible to insert the pixels of the odd field into the even field, and to reproduce only the even field.

Furthermore, although the data are compressed to $\frac{1}{2}$, that is, N is set at 2, in this embodiment, other compression ratios can be employed. For example, when one frame is composed of three fields, that is N=3, each field data is recorded in four tracks on a tape during one frame interval, and then is reproduced at a tape speed three times the normal speed, and at the normal drum rotational frequency. Likewise, when one frame is composed of four fields, that is N=4, each field data is recorded in three tracks on the tape during one frame interval, and then is reproduced at a tape speed four times the normal speed, and at the normal drum rotational frequency. In addition, although data are recorded in twelve tracks per frame at the normal recording and reproduction in this embodiment, the number of tracks can be set at any even number.

Embodiment 2

Figure 9:
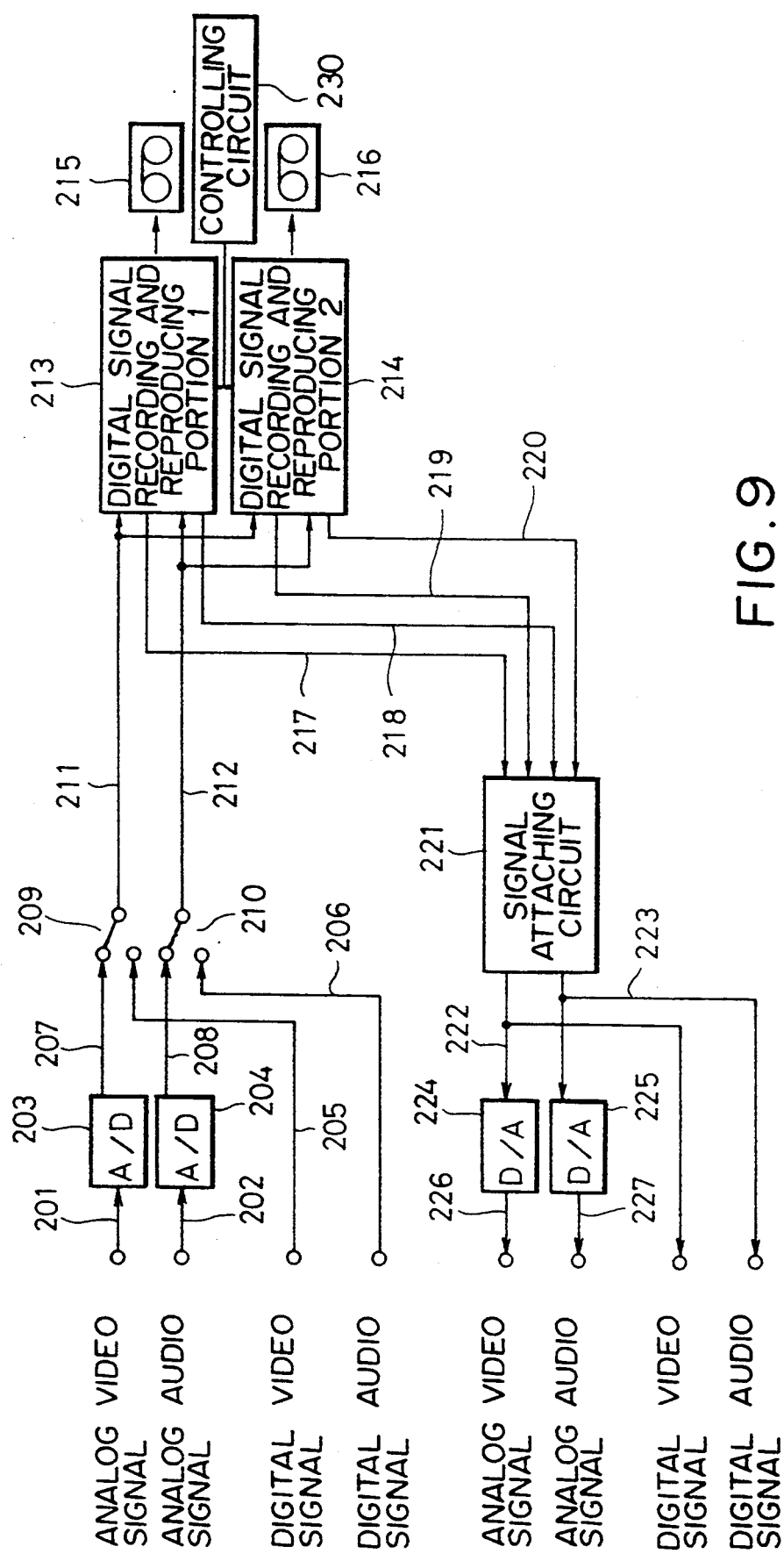
FIG. 9 is a block diagram showing the arrangement of a second embodiment of an apparatus and method for generating a high speed dubbing signal according to the present invention.

FIG. 9 is a block diagram showing the arrangement of a second embodiment of a high speed dubbing apparatus in accordance with the present invention. In this figure, when a recording is carried out, an analog video signal 101 and an analog audio signal 202 are inputted to A/D converters 203 and 204, and are converted into a digital video signal 207 and a digital audio signal 208, respectively. The digital signals 207 and 208 are applied to respective first input terminals of switches 209 and 210, and are selectively outputted. On the other hand, a digital video signal 205 and a digital audio signal 206 are applied to respective second input terminals of the switches 209 and 210, and are selectively outputted. Thus, the switches 209 and 210 select one of the two inputs, and output a digital video signal 211 and a digital audio signal 212. These signals 211 and 212 are inputted to a first digital signal recording and reproducing portion 213 and a second digital signal recording and reproducing portion 214, and are recorded on cassette tapes 215 and 216, respectively, at the normal tape speed and drum rotational frequency.

On the other hand, the reproduction is carried out as follows: First, the signals recorded on the cassette tapes 215 and 216 are reproduced by the first digital signal recording and reproducing portion 213 and the second digital signal recording and reproducing portion 214 as digital video signals 217 and 219, and digital audio signals 218 and 220. The digital signals 217, 219, 218 and 220 are inputted to a signal attaching circuit 221 so as to undergo processing as described below, and are outputted as a digital video signal 222 and a digital audio signal 223. The digital signals 222 and 223 are inputted to D/A converters 224 and 225 to be converted into analog signals, and are outputted as an analog video signal 226 and an analog audio signal 227, respectively.

The operation of the second embodiment in accordance with the present invention will be described assuming that the input video signal is an NTSC signal and the audio signal is a two-channel signal. When the input video signal is the analog signal 201, it is quantized by the A/D converter 203 into an 8-bit digital signal at the sampling frequency 4 fsc where fsc is a subcarrier frequency, and is applied to the switch 209 as the digital video signal 207. When the input signal is the two-channel analog audio signal 202, it is quantized by the A/D converter 204 into a 16-bit signal at the sampling frequency of 48 kHz, and is applied to the switch 210 as the digital audio signal 208. The switches 209 and 210 select the digital video signal 207 and the digital audio signal 208 when the input signals are analog, and select the digital video signal 205 and the digital audio signal 206 when the input signals are digital. The selected digital signals are inputted to the first and second digital signal recording and reproducing portions 213 and 214. Each of the two digital signal recording and reproducing portions 213 and 214 records the digital video signal 211 and digital audio signal 212 on the cassette tapes 215 and 216 simultaneously at the normal tape traveling speed and at the normal drum rotational frequency in such a manner that each one field is composed of six tracks.

Figure 10A:
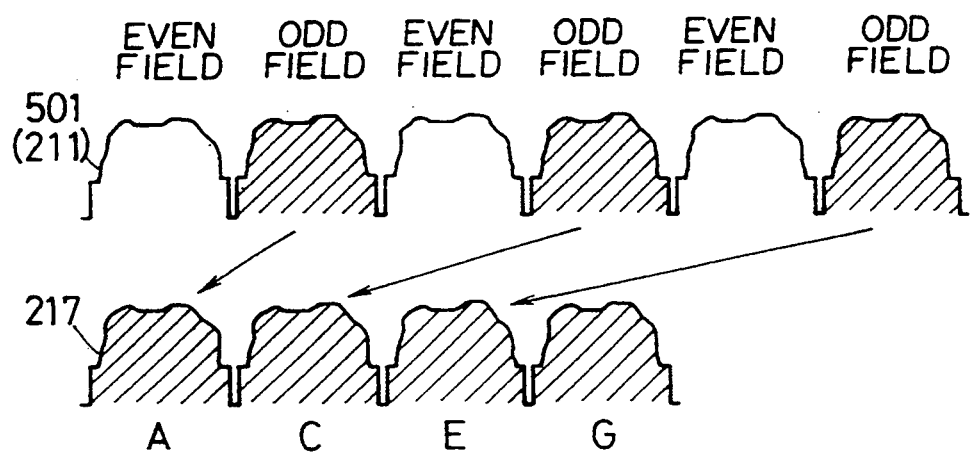
FIGS. 10A–10C are schematic diagrams illustrating the state of processing of digital video signals in the second embodiment.

The reproduction from the cassette tapes 215 and 216 is achieved by using the digital signal recording and reproducing portions 213 and 214, which are synchronized by a control signal supplied from a control circuit 230. As shown in FIG. 10A, the first digital signal recording and reproducing portion 213 selectively reproduces the odd field signal 217 from the recorded digital video signal 501 at the normal drum rotational frequency and at a tape traveling speed twice the normal speed. Here, the odd field signal 217 includes video data A, C, E, G and so on as shown in FIG. 10A. The reproduced odd field signal 217 is inputted to the signal attaching circuit 221. The audio signal is reproduced in a similar manner: the signal in audio sectors in tracks associated with the odd field is selectively reproduced, and is inputted to the signal attaching circuit 221 as the digital audio signal 218.

Figure 10B:
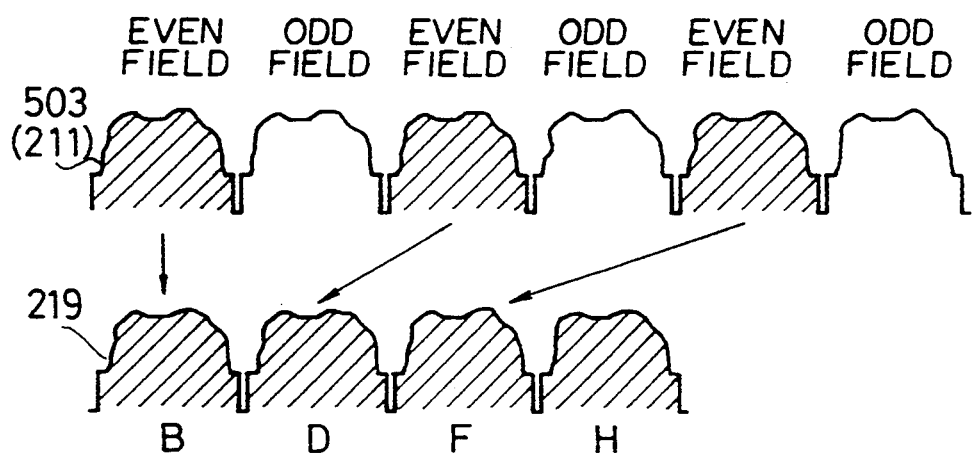

Likewise, as shown in FIG. 10B, the second digital signal recording and reproducing portion 214 selectively reproduces the even field signal 219, which constitutes each frame together with the odd field, from the recorded digital video signal 503 at the normal drum rotational frequency and at the tape traveling speed twice the normal speed. Here, the even field signal 219 includes video data B, D, F, H and so on as shown in FIG. 10B. The reproduced even field signal 219 is inputted to the signal attaching circuit 221. The audio signal is reproduced in a similar manner: the signal in the audio sectors in tracks associated with the even field is selectively reproduced, and is inputted to the signal attaching circuit 221 as the digital audio signal 220.

Figure 10C:
Figure 11:
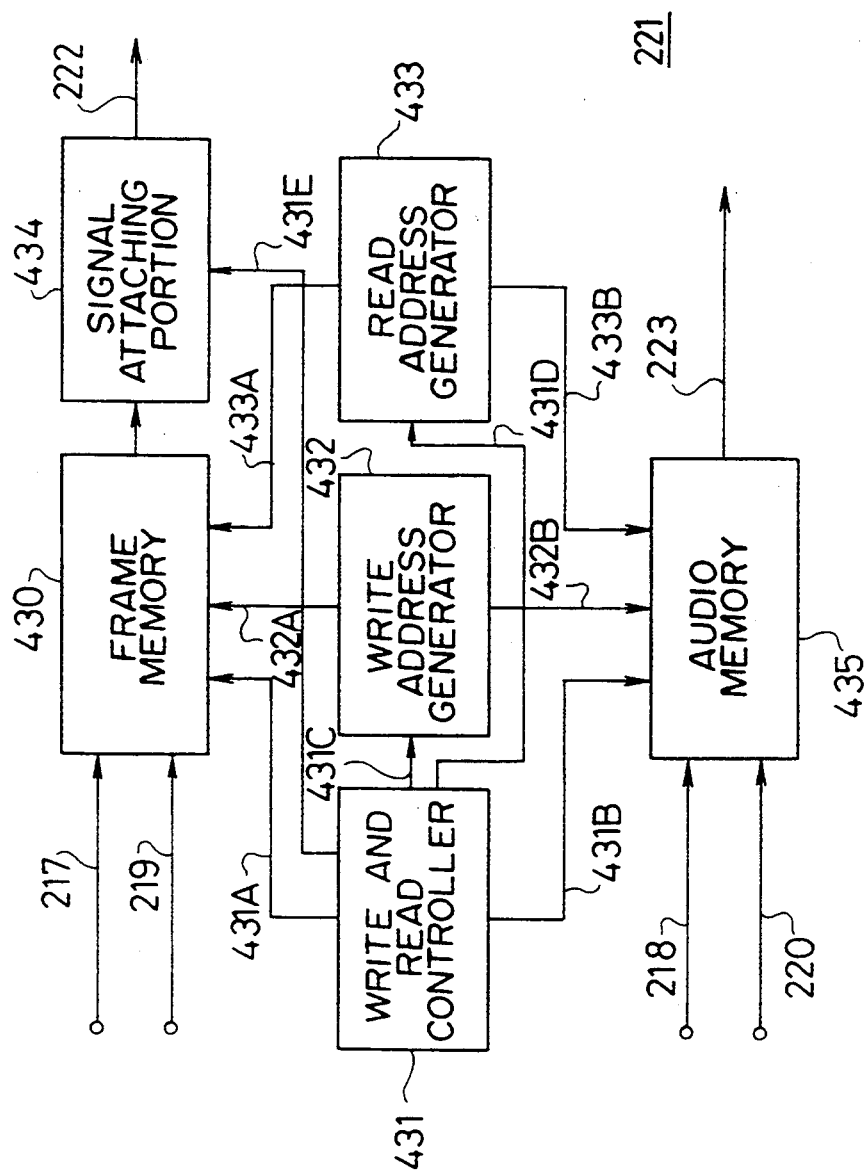
FIG. 11 is a block diagram showing the arrangement of a signal attaching circuit of the second embodiment.

FIG. 11 is a block diagram of the signal attaching circuit 221. The signal attaching circuit 221 writes the inputted digital video signals 217 and 219 to a frame memory 430 in such a manner that the video data A–H and so forth are arranged in accordance with the NTSC standard. This is performed as follows: first, a write and read controller 431 provides the frame memory with a control signal 431A to switch the operation mode of the frame memory 430 into a write mode, and also provides a write address generator 432 with a start signal 431C to activate the generator; and second, the digital video signals 217 and 219 are written into the frame memory 430 in accordance with a write address 432A generated by the write address generator 432. Subsequently, the content of the frame memory 430 is read by a clock whose frequency is twice the writing clock frequency as follows: first, the write and read controller 431 provides the frame memory 430 with the control signal 431A to switch the operation mode of the frame memory 430 into a read mode, and also provides a read address generator 433 with a start signal 431D to activate the generator; and second, the stored data in the frame memory 430 is read out in accordance with a read address 433A generated by the read address generator 433. The read out data is then converted into the double pitched NTSC video signal 222 as shown in FIG. 10C by a signal attaching portion 434. This is performed by providing the read out data with the synchronizing signal whose pitch is twice the NTSC synchronizing signal, and with the subcarrier (2 fsc) whose pitch is twice the subcarrier (fsc). Thus, the double pitched NTSC signal 222 is generated in which the video data A–H and so on are rearranged in accordance with the NTSC standard, and is outputted from the signal attaching circuit 221. The video signal 222 is further converted into an analog video signal 226 with the D/A converter 224, and is outputted therefrom.

Next, the processing of the audio signal in the signal attaching circuit 221 will be described. The digital audio signals 218 and 220 inputted to the signal attaching circuit 221 are written into an audio memory 435 so that the audio signal of the A1 and A2 channels is decoded. This is performed as follows: first, the write and read controller 431 provides the audio memory 435 with a control signal 431B to switch the operation mode of the audio memory 435 into a write mode, and also provides the write address generator 432 with the start signal 431C to activate the generator; and second, the digital audio signals 218 and 220 are written into the audio memory 435 in accordance with a write address 432B generated by the write address generator 432. Subsequently, the content of the audio memory 435 is read therefrom by the clock whose frequency is twice the write clock as follows: first, the write and read controller 431 provides the audio memory 435 with the control signal 431B to switch the operation mode of the audio memory 435 into a read mode, and also provides the read address generator 433 with the start signal 431D to activate the generator; and second, the stored data in the audio memory 435 is read out in accordance with a read address 433B generated by the read address generator 433 as the double pitched, two channel (A1 and A2) digital audio signal 223. The double pitched digital video signal 222 and digital audio signal 223, or the corresponding analog video signal 226 and analog audio signal 227 obtained by converting the digital signals 222 and 223 through the D/A converters 126 and 127, are subjected to high speed dubbing by a VTR whose tape speed is twice the normal speed.

Although only the tracks recording the odd fields are reproduced from one tape, and only the tracks recording the even fields are reproduced from the other tape in the second embodiment, any arrangement of tracks can be employed within one frame interval or within a predetermined unit time period as long as duplicate reproductions of the same track in a field by the respective tape reproduction apparatuses are inhibited. The tracks unnecessary for reproduction can be omitted before recording.

Furthermore, although two tapes are simultaneously used to record and reproduce the data, that is, N is set at 2, in this embodiment, more tapes can be simultaneously employed. For example, when one frame is composed of three fields, that is N=3, each field data is recorded on one tape during one frame interval, and then three tapes are simultaneously reproduced at a tape speed three times the normal speed, and at the normal drum rotational frequency. Likewise, when one frame is composed of four fields, that is N=4, each field data is recorded on one tape during one frame interval, and then the four tapes are simultaneously reproduced at a tape speed four times the normal speed, and at the normal drum rotational frequency. In addition, although data are recorded in twelve tracks per frame at the normal recording and reproduction in this embodiment, the number of tracks can be set at any even number.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An apparatus for generating and recording a high speed dubbing signal which generates the high speed dubbing signal from a first digital signal consisting of frame signals, and which records the high speed dubbing signal on a tape, each of the frame signals consisting of N data segments, where N is an integer greater than one, said apparatus comprising:
   data compressing means for reducing the amount of information in the first digital signal by a factor of N by compressing the N data segments within one frame interval so that one frame signal is compressed into one data segment interval, and by arranging the compressed data into one data segment to form a second digital signal; and
   recording means including a head drum that rotates heads for performing helical recording of the second digital signal on said tape at a normal tape speed and at a normal drum rotational frequency in such a manner that the second digital signal associated with one data segment is recorded on M/N tracks on a predetermined length of tape during one frame interval, where M is the number of tracks that would be needed to record the first digital signal on the predetermined length of tape during one frame interval at the normal tape speed and drum rotational frequency.

2. An apparatus for generating and recording a high speed dubbing signal as claimed in claim 1, wherein the integer N is two, three or four.

3. An apparatus for generating and recording a high speed dubbing signal as claimed in claim 2, wherein said first digital signal comprises at least one of a digital video signal and a digital audio signal.

4. An apparatus for reproducing and outputting a high speed dubbing signal from a tape which records a second digital signal formed from a first digital signal consisting of frame signals, each of the frame signals consisting of N data segments, where N is an integer greater than one, the first digital signal being compressed by a factor of N by reducing the amount of information in the N data segments within one frame interval so that one frame signal is compressed into one data segment interval, and by arranging the compressed data into one data segment to form the second digital signal, the second digital signal being helically recorded on said tape at a normal tape speed and at a normal drum rotational frequency in such a manner that the second digital signal associated with one data segment is recorded on M/N tracks on a predetermined length of tape during one frame interval, where M is the number of tracks that would be needed to record the first digital signal on the predetermined length of tape during one frame interval at the normal tape speed and drum rotational frequency, said apparatus comprising:
   reproduction means including a head drum that rotates heads for reproducing only the second digital signal from the tape at a tape speed N times the normal tape speed and at the normal drum rotational frequency;
   data expanding means for expanding each one of said data segments of said reproduced second digital signal by a factor of N so that the compressed signal associated with one frame is recovered to form a third digital signal; and
   means for outputting the third digital signal as the high speed dubbing signal, the high speed dubbing signal having a pitch N times that of the first digital signal.

5. An apparatus for reproducing and outputting a high speed dubbing signal as claimed in claim 4, wherein the integer N is two, three or four.

6. An apparatus for reproducing and outputting a high speed dubbing signal as claimed in claim 5, wherein said third digital signal comprises at least one of a digital video signal and a digital audio signal.

7. An apparatus for reproducing and outputting a high speed dubbing signal as claimed in claim 4, wherein said data expanding means comprises means for using an interpolation process to expand each one of said data segments of said reproduced second digital signal by a factor of N.

8. An apparatus for reproducing and outputting a high speed dubbing signal by reproducing from N tapes a first digital signal consisting of frame signals, where N is an integer greater than one, each of the frame signals consisting of N data segments, the first digital signal being helically recorded on each of the N tapes in such a manner that the first digital signal associated with one frame is divided into M tracks at a normal tape speed and at a normal drum rotational frequency, where M is an integer that makes M/N an integer equal to or greater than one, said apparatus comprising:

reproduction means, including N head drums each of which rotates heads, for reproducing during one data segment interval only one data segment of the first digital signal from each of the N tapes at a tape speed N times the normal tape speed and at a normal drum rotational frequency, thereby reproducing N different data segments belonging to the same frame signal during one data segment interval;

means for generating a second signal having a pitch N times that of the first digital signal by rearranging each of the reproduced N data segments into one frame signal; and means for outputting the second digital signal as the high speed dubbing signal, the high speed dubbing signal having a pitch N times that of the first digital signal.

9. An apparatus for reproducing and outputting a high speed dubbing signal as claimed in claim 8, wherein the integer N is two, three or four.

10. An apparatus for reproducing and outputting a high-speed dubbing signal as claimed in claim 9, wherein said first digital signal comprises at least one of a digital video signal and a digital audio signal.

11. A method for generating and recording a high speed dubbing signal which generates the high speed dubbing signal from a first digital signal consisting of frame signals, and which records the high speed dubbing signal on a tape, each of the frame signals consisting of N data segments, where N is an integer greater than one, said method comprising the steps of:

reducing the amount of information in the first digital signal by a factor of N by compressing the N data segments within one frame interval so that one frame signal is compressed into one data segment interval, and by arranging the compressed data into one data segment to form a second digital signal; and performing helical recording of the second digital signal on said tape at a normal tape speed and at a normal drum rotational frequency in such a manner that the second digital signal associated with one data segment is recorded on M/N tracks on a predetermined length of tape during one frame interval, where M is the number of tracks that would be needed to record the first digital signal on the predetermined length of tape during one frame interval at the normal tape speed and drum rotational frequency.

12. A method for generating and recording a high speed dubbing signal as claimed in claim 11, wherein the integer N is two, three or four.

13. A method for generating and recording a high speed dubbing signal as claimed in claim 12, wherein said first digital signal comprises at least one of a digital video signal and a digital audio signal.

14. A method for reproducing and outputting a high speed dubbing signal from a tape which records a second digital signal formed from a first digital signal consisting of frame signals, each of the frame signals consisting of N data segments, where N is an integer greater than one, the first digital signal being compressed by a factor of N by reducing the amount of information in the N data segments within one frame interval so that one frame signal is compressed into one data segment interval, and by arranging the compressed data into one data segment to form the second digital signal, the second digital signal being helically recorded on said tape at a normal tape speed and at a normal drum rotational frequency in such a manner that the second digital signal associated with one data segment is recorded on M/N tracks on a predetermined length of tape during one frame interval, where M is the number of tracks that would be needed to record the first digital signal on the predetermined length of tape during one frame interval at the normal tape speed and drum rotational frequency, said method compressing the steps of:

reproducing only the second digital signal from the tape at a tape speed N times the normal tape speed and at the normal drum rotational frequency;

expanding each of said data segments of said reproduced second digital signal by a factor of N so that the compressed signal associated with one frame is recovered to form a third digital signal; and outputting the third digital signal as the high speed dubbing signal, the high speed dubbing signal having a pitch N times that of the first digital signal.

15. A method for reproducing and outputting a high speed dubbing signal as claimed in claim 14, wherein said step of expanding each of said data segments of said reproduced second digital signal by a factor of N is conducted using an interpolation process.

16. A method for reproducing and outputting a high speed dubbing signal by reproducing from N tapes a first digital signal consisting of frame signals, where N is an integer greater than one, each of the frame signals consisting of N data segments, the first digital signal being helically recorded on each of the N tapes in such a manner that the first digital signal associated with one frame is divided into M tracks at a normal tape speed and at a normal drum rotational frequency, where M is an integer that makes M/N an integer equal to or greater than one, said method comprising the steps of:

reproducing during one data segment interval only one data segment of the first digital signal from each one of the N tapes at a tape speed N times the normal tape speed and at a normal drum rotational frequency, thereby reproducing N different data segments belonging to the same frame signal during one data segment interval;

generating a second signal having a pitch N times that of the first digital signal by rearranging each one of the reproduced N data segments as one frame signal; and outputting the second digital signal as the high speed dubbing signal, the high speed dubbing signal having a pitch N times that of the first digital signal.

17. A method for reproducing and outputting a high speed dubbing signal as claimed in claim 16, wherein the integer N is two, three or four.

18. A method of reproducing and outputting a high speed dubbing signal as claimed in claim 17, wherein said first digital signal comprises at least one of a digital video signal and a digital audio signal.

* * * * *